(12) United States Patent
Finkel

(10) Patent No.: US 7,581,939 B1
(45) Date of Patent: Sep. 1, 2009

(54) APPARATUS FOR ALIGNING FIRST AND SECOND TOOL SECTIONS AND TOOL UTILIZING SAME

(76) Inventor: Brian G. Finkel, 4883 Omena Ct., Sterling Heights, MI (US) 48314

( * ) Notice: Subject to any disclaimer, the term of this patent is extended or adjusted under 35 U.S.C. 154(b) by 0 days.

(21) Appl. No.: 12/163,151

(22) Filed: Jun. 27, 2008

(51) Int. Cl.
*B29C 33/30* (2006.01)

(52) U.S. Cl. .......... 425/190; 29/465; 164/342; 164/387; 249/160; 249/205; 384/30; 403/14; 403/24; 425/193; 425/450.1; 425/472

(58) Field of Classification Search .......... 425/190, 425/193, 450.1, 472; 249/160, 205; 164/342, 164/387; 403/14, 24; 384/30; 29/465
See application file for complete search history.

(56) References Cited

U.S. PATENT DOCUMENTS

| | | | |
|---|---|---|---|
| 2,339,792 A | | 1/1944 | Milano |
| 3,081,494 A | * | 3/1963 | Darnell ............ 249/160 |
| 3,379,239 A | * | 4/1968 | Rusk et al. ............ 164/387 |
| 3,776,299 A | | 12/1973 | Rusk et al. |
| 3,870,092 A | | 3/1975 | Rusk et al. |
| 3,970,138 A | | 7/1976 | Buhrer |
| 4,199,313 A | | 4/1980 | Bohnenberger |
| 4,386,868 A | | 6/1983 | Bluver et al. |
| 5,332,384 A | * | 7/1994 | Abramat ............ 425/450.1 |
| 5,882,695 A | * | 3/1999 | Starkey ............ 425/190 |

FOREIGN PATENT DOCUMENTS

JP   9-70831   *   3/1997

* cited by examiner

*Primary Examiner*—James Mackey
(74) *Attorney, Agent, or Firm*—Brooks Kushman P.C.

(57) ABSTRACT

Apparatus including a collar for aligning opposing first and second tool sections such as mold halves during closing of the tool sections and a tool utilizing same are provided. Each apparatus includes a projection such as a solid pin integrally including a frustum-shaped tapered portion and a cylindrically-shaped guide portion. The apparatus further includes a bushing having an upper surface and a central opening with internal contours which are complementary to outer contours of the guide portion. The collar has a lower surface and a central opening which is aligned with the central opening of the bushing when the collar is mounted at a predetermined position on the bushing with the upper and lower surfaces in abutting engagement. The collar opening has internal contours which are complementary to outer contours of the tapered portion. The tapered portion of the projection and the collar guide and direct the tool sections into alignment as the tool sections close. The tool includes the first and second sections and a plurality of the apparatus.

16 Claims, 2 Drawing Sheets

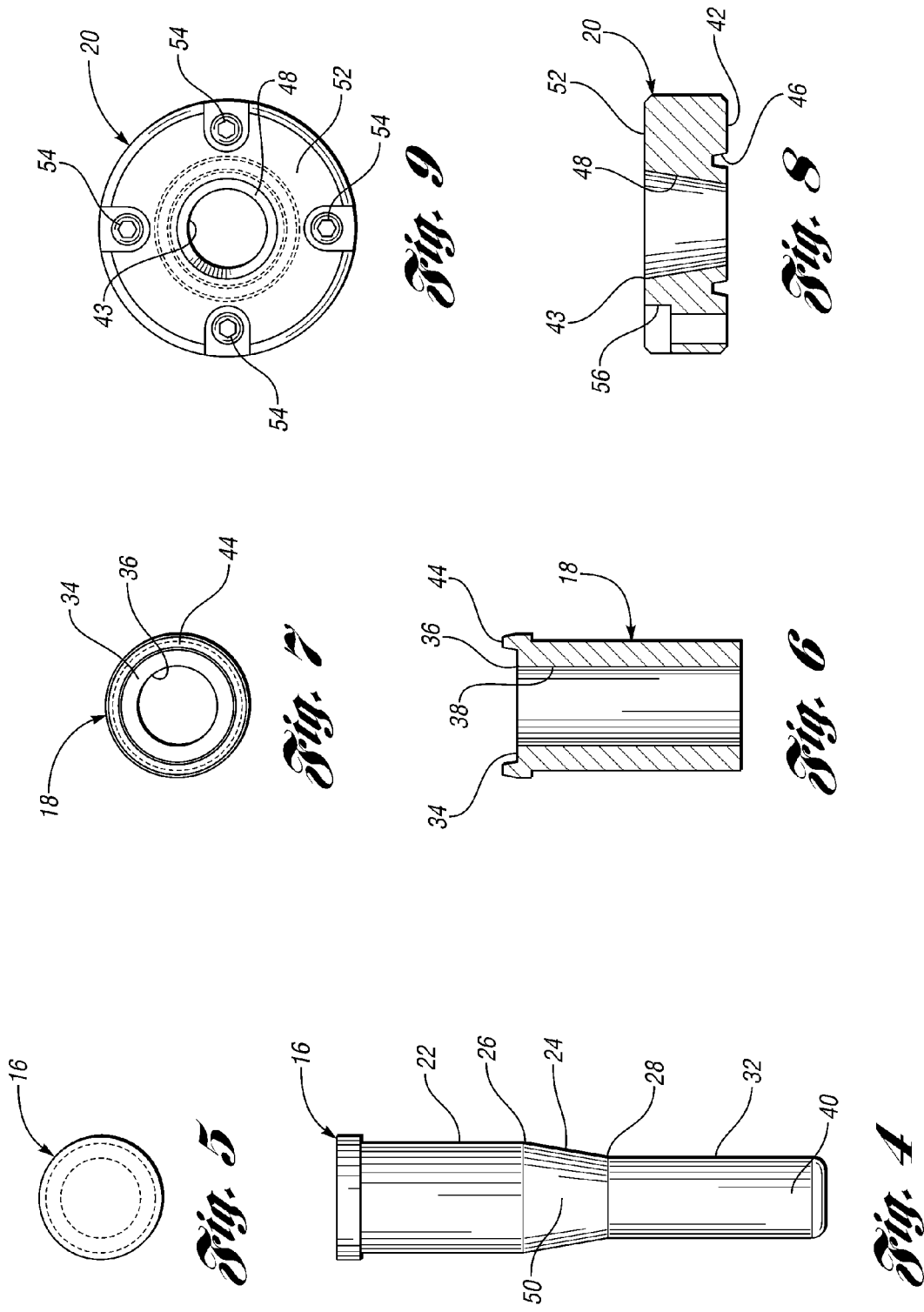

APPARATUS FOR ALIGNING FIRST AND SECOND TOOL SECTIONS AND TOOL UTILIZING SAME

BACKGROUND OF THE INVENTION

1. Field of the Invention

This invention relates to an apparatus for aligning first and second tool sections such as mold halves and tools utilizing same.

2. Background Art

Tool sections such as mold halves must become properly aligned during closing so that any parts or cavities on one tool section are accurately registered with corresponding parts or cavities on the other tool section in a closed position of the sections.

Molds generally have at least two halves which move together and apart during their routine cyclic operation. One of the mold halves usually includes at least four leader pins which fit into complementary bushings in the opposite mold half. When the mold closes, these pins and bushings align the two mold halves. An example of such a pin and bushing mounted in their respective mold halves is shown in FIG. 1.

U.S. Pat. No. 4,386,868 discloses a leader pin for guiding and directing the halves of a mold as it opens and closes. The pin has a base, a shoulder at one end of the base, and a frustoconical tapered section which extends outwardly from a ledge on the base. A cylindrical guide pin projects outwardly from the narrow end of the tapered section. The tapered section and the guide pin fit into a complementary tapered and cylindrical opening in the sleeve of a bushing. The two tapered sections guide, direct, and align the mold halves.

The following U.S. patents are also related to the present invention: U.S. Pat. Nos. 2,339,792; 3,776,299; 3,870,092; 3,970,138; and 4,199,313.

One problem associated with the prior art in general is that larger and, consequently, heavier tool sections need to be aligned. The bushings mounted on one of the tool sections often times cannot withstand the relatively large amounts of side forces or pressures (i.e., loads) from their respective pins which are mounted on the other of the tool sections.

SUMMARY OF THE INVENTION

An object of the present invention is to provide an improved apparatus for aligning first and second tool sections and tool utilizing same, wherein one or more properly sized collars separate from their corresponding bushings are used to withstand side forces or pressures encountered during closure of the tool sections.

In carrying out the above object and other objects of the present invention, an apparatus for aligning opposing first and second tool sections during closing of the tool sections is provided. The apparatus includes a projection integrally including a base portion and a frustum-shaped tapered portion with a broad end and a narrow end. The broad end is integrally formed onto one end of the base portion. The projection also integrally includes a cylindrically-shaped guide portion which projects away from and is integrally formed onto the narrow end of the tapered portion. The apparatus further includes a bushing having an upper surface and a central opening with internal contours which are complementary to outer contours of the guide portion. The apparatus still further includes a collar having a lower surface and a central opening which is aligned with the central opening of the bushing when the collar is mounted at a predetermined position on the bushing with the upper and lower surfaces in abutting engagement. The collar opening has internal contours which are complementary to outer contours of the tapered portion. The tapered portion of the projection and the collar guide and direct the tool sections into alignment as the tool sections close.

Surface contours of the lower surface of the collar may be complementary to surface contours of the upper surface of the bushing to join the bushing and the collar at the predetermined position.

The collar may have a peripheral portion. The apparatus may further include a plurality of fasteners for mounting the collar to the first tool section at the peripheral portion of the collar.

The frustum-shaped tapered portion of the projection may be tapered at an angle of approximately 10°.

The base portion may be cylindrically-shaped.

The projection may be a solid pin.

The tool sections may be mold halves.

The peripheral portion of the collar may have a plurality of holes extending completely therethrough. The fasteners may extend completely through their respective holes to mount the collar to the first tool section at the peripheral portion of the collar.

Further in carrying out the above object and other objects of the present invention, a tool including opposing tool sections which open and close during a work cycle is provided. The tool further includes a plurality of projections mounted on at least one of the tool sections, opposing bushings mounted on the other of the tool sections, and opposing collars mounted on their respective bushings. Each projection integrally includes a base portion, and a frustum-shaped tapered portion with a broad end and a narrow end. The broad end is integrally formed onto one end of the base portion. Each projection also integrally includes a cylindrically-shaped guide portion which projects away from and is integrally formed onto the narrow end of its tapered portion. Each bushing has an upper surface and a central opening with internal contours which are complementary to outer contours of its respective guide portion. Each collar has a lower surface and a central opening which is aligned with the central opening of its respective bushing when the collar is mounted at a predetermined position on its respective bushing with the upper and lower surfaces in abutting engagement. Each collar opening has internal contours which are complementary to outer contours of its respective tapered portion. The tapered portions of the projections and their respective collars guide and direct the tool sections into alignment as the tool sections close.

Surface contours of the lower surface of each collar may be complementary to surface contours of the upper surface of their respective bushing to join the bushings and their respective collars at the predetermined positions.

Each collar may have a peripheral portion and the tool may further include a plurality of fasteners for mounting the collars on the other of the tool sections at the peripheral portions of the collars.

The frustum-shaped tapered portion of each projection may be tapered at an angle of approximately 10°.

Each base portion may be cylindrically-shaped.

Each projection may be a solid pin.

The tool sections may be mold halves.

The peripheral portion of each collar may have a plurality of holes extending completely therethrough. The fasteners may extend completely through their respective holes to mount the collars on the other of the tool sections at the peripheral portions of the collars.

BRIEF DESCRIPTION OF THE DRAWINGS

FIG. 4 is an elevational view of a solid pin of the apparatus of FIGS. 2 and 3;

FIG. 5 is a top plan view of the pin of FIG. 4;

FIG. 6 is an elevational view, in cross section, of a bushing of the apparatus of FIGS. 2 and 3;

FIG. 7 is a top plan view of the bushing of FIG. 6;

FIG. 8 is an elevational view, in cross section, of a collar of the apparatus of FIGS. 2 and 3; and FIG. 9 is a top plan view of the collar of FIG. 8 together with threaded bolts.

DETAILED DESCRIPTION OF THE PREFERRED EMBODIMENT(S)

Figure 1:
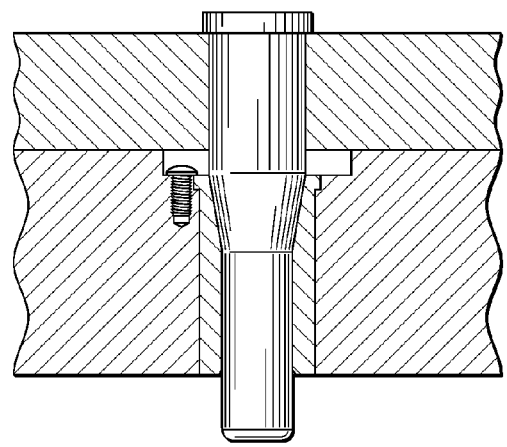
FIG. 1 is a side schematic view, partially broken away and in cross section, of a prior art apparatus including a leader pin received and retained within a bushing both mounted within their respective mold halves.
Figure 2:
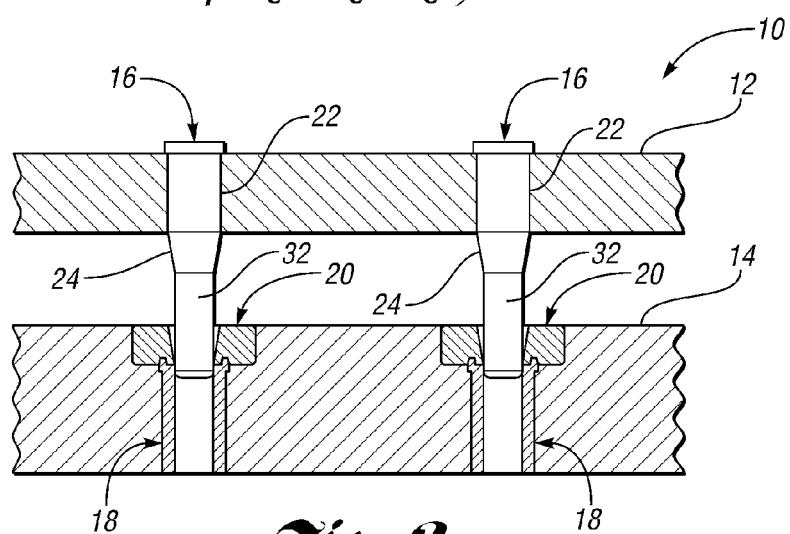
FIG. 2 is a side schematic view, partially broken away and in cross section, of a mold with its mold halves open and illustrating a pair of apparatus of one embodiment of the present invention.
Figure 3:
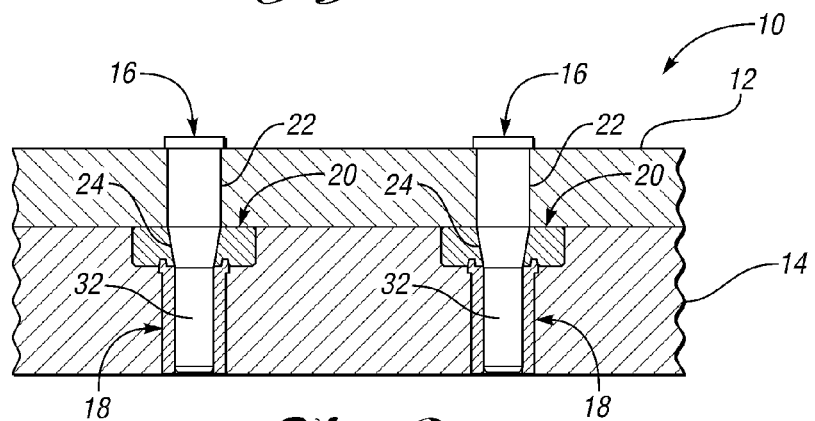
FIG. 3 is a side schematic view, partially broken away and in cross section, of a mold with its mold halves closed and illustrating the pair of apparatus of FIG. 2.

Referring now to the drawing figures, there is illustrated in FIGS. 2 and 3, a tool such as a mold, generally indicated at 10, having opposing mold sections or halves 12 and 14. The opposing mold sections or halves 12 and 14 open (i.e., FIG. 2) to remove a finished part or to place a part between the mold halves 12 and 14. The mold halves 12 and 14 close to mold or form a part or composite part (i.e., FIG. 3). The mold 10 opens and closes during a work cycle.

The tool 10 further includes a plurality (i.e., such as four or more) of projections or solid pins, generally indicated at 16, mounted on the upper mold section 12 and opposing bushings, generally indicated at 18, mounted on the lower mold section 14. The pins 16 may be placed in either the top mold half 12 or the bottom mold half 14. Generally, all of the pins 16 are mounted on one mold half and all bushings 18 are mounted on the opposite mold half. The pins 16 and the bushings 18 may be secured in the mold 10 by any suitable means. For example, the bushings 18 may be secured in the tool 10 by collars, generally indicated at 20, mounted on their respective bushings 18 as shown in FIGS. 2 and 3.

Referring now to FIGS. 4 and 5, each projection or pin 16 integrally includes a cylindrically-shaped base portion 22, and a frustum-shaped tapered portion 24 with a broad end 26 and a narrow end 28. The broad end 26 is integrally formed onto one end 30 of the base portion 22. The other end of the base portion 22 includes a shoulder portion. The pin 16 also includes a cylindrically-shaped guide portion 32 which projects away from and is integrally formed onto the narrow end 28 of the tapered portion 24.

Referring now to FIGS. 6 and 7, each bushing 18 has an upper surface 34 and a central opening 36 with internal contours 38 which are complementary to outer contours 40 of its respective guide portion 32 so that a snug fit results therebetween.

Referring now to FIGS. 8 and 9, each collar 20 has a lower surface 42 and a central opening 43 which is aligned with the central opening 36 of its respective bushing 18 when the collar 20 is mounted at a predetermined position on its respective bushing 18 with the upper and lower surfaces 34 and 42, respectively, in abutting engagement (as shown in FIGS. 2 and 3). The predetermined position is defined by a circular ridge 44 on the upper surface 34 of the bushing 18 which fits within a corresponding circular groove 46 in the lower surface 42 of the collar 20 (as also shown in FIGS. 2 and 3).

Each collar opening 43 has internal contours 48 which are complementary to outer contours 50 of its respective tapered portion 24 so that a snug fit results therebetween. The frustum-shaped tapered portion 24 of each projection 16 may be tapered at an angle of approximately 10° which corresponds to the angle of the internal contours 48 of the collars 20. The tapered portions 24 of the projections 16 and their respective collars 20 guide and direct the tool sections 12 and 14 into alignment as the tool sections 12 and 14 close. The pins 16 press against the collars 20 and not the bushings 18 as in the prior art.

The surface contours including the groove 46 in the lower surface 42 of each collar 20 is complementary to the surface contours including the ridge 44 of the upper surface 34 of their respective bushing 18 to join the bushings 18 and their respective collars 20 at the predetermined positions.

Each collar 20 has a peripheral portion 52 and the tool 10 may further include a plurality of fasteners such as bolts 54 (FIG. 9) for mounting the collars 20 on the lower tool section 14 at the peripheral portions 52 of the collars 20. The peripheral portion 52 of each collar 20 has a plurality of holes 56 (only one of which is shown in FIG. 8) which extend completely therethrough. The fasteners 54 extend completely through their respective holes 56 to mount the collars 20 on the lower tool section 14 at the peripheral portions 52 of the collars 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for aligning opposing first and second tool sections during closing of the tool sections, the apparatus comprising:

a projection integrally including: a base portion; a frustum-shaped tapered portion with a broad end and a narrow end, the broad end being integrally formed onto one end of the base portion; and a cylindrically-shaped guide portion projecting away from and integrally formed onto the narrow end of the tapered portion;

a bushing having an upper surface and a central opening with internal contours which are complementary to outer contours of the guide portion; and a collar having a lower surface and a central opening which is aligned with the central opening of the bushing when the collar is mounted at a predetermined position on the bushing with the upper and lower surfaces in abutting engagement, the collar opening having internal contours which are complementary to outer contours of the tapered portion, the tapered portion of the projection and the collar guiding and directing the tool sections into alignment as the tool sections close.

2. The apparatus as claimed in claim 1, wherein surface contours of the lower surface of the collar are complementary to surface contours of the upper surface of the bushing to join the bushing and the collar at the predetermined position.

3. The apparatus as claimed in claim 1, wherein the collar has a peripheral portion and wherein the apparatus further comprises a plurality of fasteners for mounting the collar to the first tool section at the peripheral portion of the collar.

4. The apparatus as claimed in claim 1, wherein the frustum-shaped tapered portion of the projection is tapered at an angle of approximately 10°.

5. The apparatus as claimed in claim 1, wherein the base portion is cylindrically-shaped.

6. The apparatus as claimed in claim 1, wherein the projection is a solid pin.

7. The apparatus as claimed in claim 1, wherein the tool sections are mold halves.

8. The apparatus as claimed in claim 3, wherein the peripheral portion of the collar has a plurality of holes extending completely therethrough and wherein the fasteners extend completely through their respective holes to mount the collar to the first tool section at the peripheral portion of the collar.

9. A tool comprising:
    opposing tool sections which open and close during a work cycle;
    a plurality of projections mounted on at least one of the tool sections;
    opposing bushings mounted on the other of the tool sections; and
    opposing collars mounted on their respective bushings; wherein each projection integrally includes: a base portion, a frustum-shaped tapered portion with a broad end and a narrow end, the broad end being integrally formed onto one end of the base portion, and a cylindrically-shaped guide portion projecting away from and integrally formed onto the narrow end of the tapered portion; each bushing having an upper surface and a central opening with internal contours which are complementary to outer contours of its respective guide portion; each collar having a lower surface and a central opening which is aligned with the central opening of its respective bushing when the collar is mounted at a predetermined position on its respective bushing with the upper and lower surfaces in abutting engagement, each collar opening having internal contours which are complementary to outer contours of its respective tapered portion, the tapered portions of the projections and their respective collars guiding and directing the tool sections into alignment as the tool sections close.

10. The tool as claimed in claim 9, wherein surface contours of the lower surface of each collar are complementary to surface contours of the upper surface of their respective bushing to join the bushings and their respective collars at the predetermined positions.

11. The tool as claimed in claim 9, wherein each collar has a peripheral portion and wherein the tool further comprises a plurality of fasteners for mounting the collars on the other of the tool sections at the peripheral portions of the collars.

12. The tool as claimed in claim 9, wherein the frustum-shaped tapered portion of each projection is tapered at an angle of approximately 10°.

13. The tool as claimed in claim 9, wherein each base portion is cylindrically-shaped.

14. The tool as claimed in claim 9, wherein each projection is a solid pin.

15. The tool as claimed in claim 9, wherein the tool sections are mold halves.

16. The tool as claimed in claim 11, wherein the peripheral portion of each collar has a plurality of holes extending completely therethrough and wherein the fasteners extend completely through their respective holes to mount the collars on the other of the tool sections at the peripheral portions of the collars.

* * * * *